United States Patent [19]

Knapp et al.

[11] 4,051,628
[45] Oct. 4, 1977

[54] APPARATUS FOR THE IMPROVED DISPENSING OF PLANT NUTRIMENTS

[75] Inventors: Philip B. Knapp, Lynbrook, N.Y.; Harold Corey, Teaneck, N.J.

[73] Assignee: Hortigro, Inc., Lynbrook, N.Y.

[21] Appl. No.: 631,184

[22] Filed: Nov. 12, 1975

[51] Int. Cl.² .............................................. A01G 29/00
[52] U.S. Cl. ........................................... 47/48.5; 239/35
[58] Field of Search ............... 47/48.5, 1.7, DIG.4, 47/DIG. 7, DIG. 10, DIG. 13; 239/34, 39, 49, 53–55, 58; 71/64 E, 64 SC, 64 F, 33, 49, 51

[56] References Cited

U.S. PATENT DOCUMENTS

| | | | |
|---|---|---|---|
| 689,248 | 12/1901 | Timm | 47/48.5 |
| 2,649,196 | 8/1953 | Arny et al. | 47/48.5 |
| 2,759,300 | 8/1956 | Hartley | 47/48.5 X |
| 3,059,379 | 10/1962 | Attoe | 47/48.5 |
| 3,206,297 | 9/1965 | O'Connor | 71/64 F |
| 3,264,088 | 9/1966 | Hansen | 71/64 F |
| 3,304,653 | 2/1967 | Zadarnowski | 47/48.5 |
| 3,336,129 | 8/1967 | Herrett et al. | 47/DIG. 7 |
| 3,596,833 | 9/1971 | Gould | 239/54 |
| 3,649,239 | 3/1972 | Mitchell | 47/DIG. 10 |
| 3,769,748 | 11/1973 | Goldring | 47/48.5 X |
| 3,778,383 | 12/1973 | Schibler et al. | 71/64 F |
| 3,821,863 | 7/1974 | Chan | 47/48.5 |
| 3,835,578 | 9/1974 | Basile | 47/48.5 X |
| 3,900,378 | 8/1975 | Yen et al. | 47/DIG. 7 |
| 3,954,263 | 5/1976 | Whelan et al. | 47/48.5 X |
| 3,973,355 | 8/1976 | McKenzie | 47/37 |

Primary Examiner—Edgar S. Burr
Assistant Examiner—James R. Feyrer
Attorney, Agent, or Firm—Arthur B. Colvin

[57] ABSTRACT

The present invention relates to an apparatus for dispensing plant nutriments to a growing medium, such as soil, sand or the like, the apparatus being effective to transfer to the medium over protracted periods of time doses of nutriments at a rate which is a function essentially solely of the amount of water added to the growing medium at each watering. Broadly stated, the invention relates to a container which preferably includes a probe adapted to be inserted sufficiently below the surface of the growing medium to prevent evaporation. The container is sealed except for a dispensing aperture or apertures in the probe of critical size, larger than a capillary. The apparatus is characterized by its being filled with a hydrophilic gel, within which gel there has been dissolved a soluble nutriment component, preferably in saturation quantities. The gel may contain an inert soluble dye to signal the exhaustion of the active products.

10 Claims, 3 Drawing Figures

U.S. Patent     Oct. 4, 1977     4,051,628
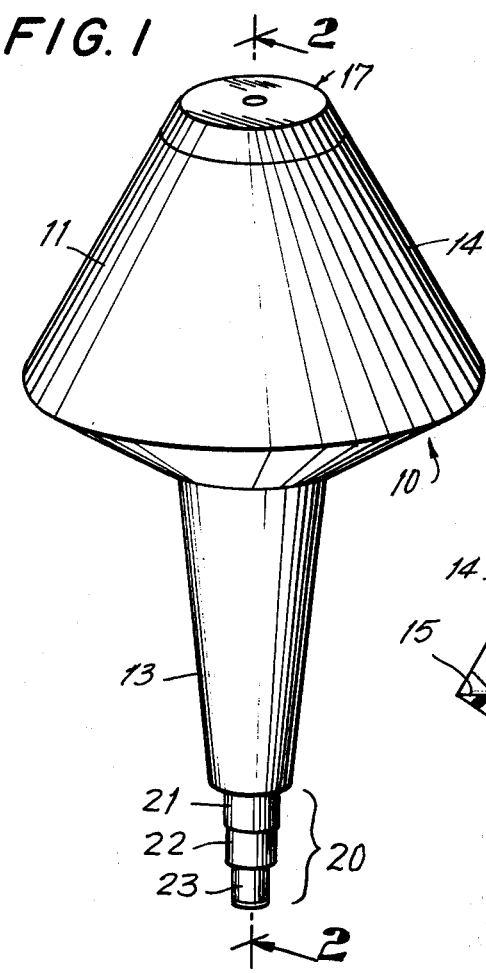
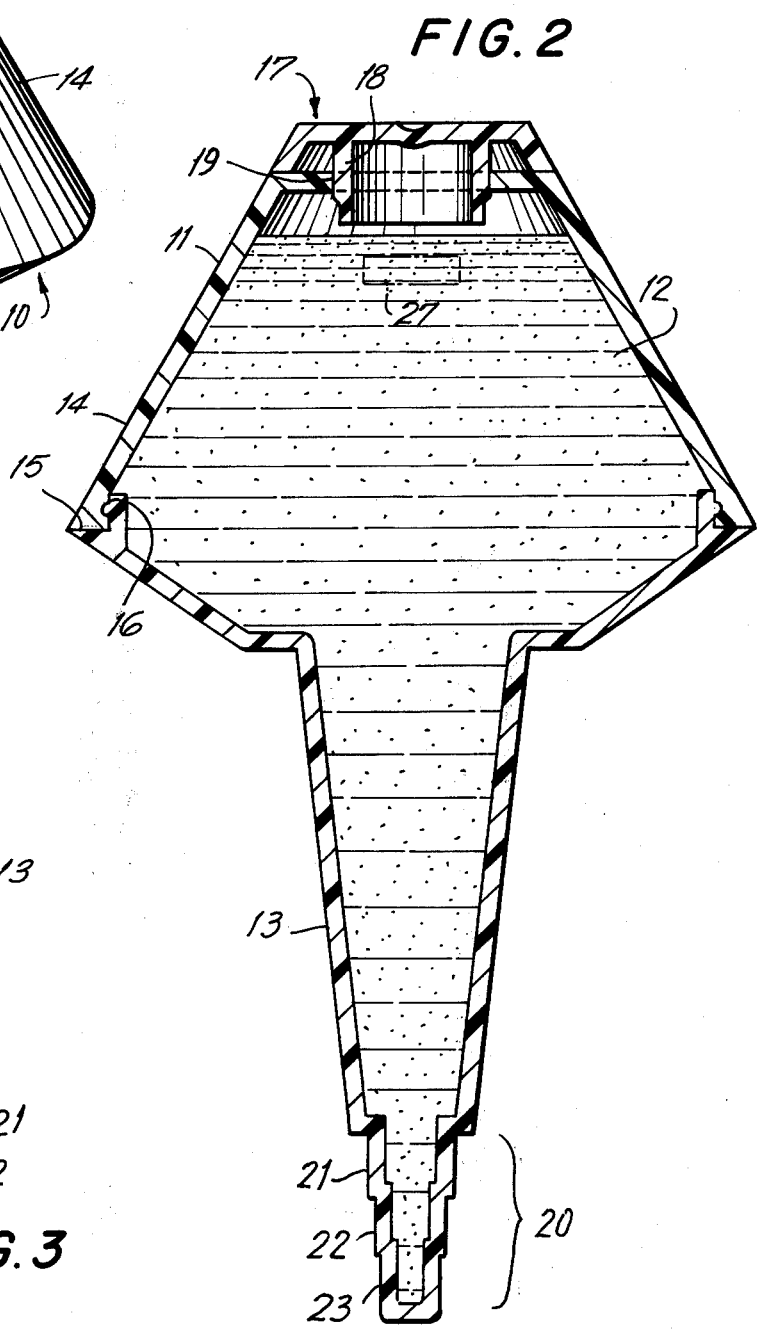
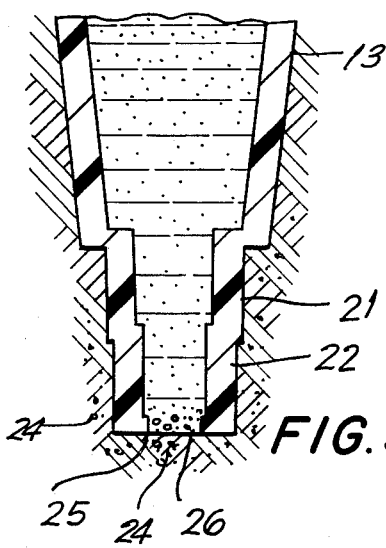

APPARATUS FOR THE IMPROVED DISPENSING OF PLANT NUTRIMENTS

BACKGROUND OF THE INVENTION

1. Field of the Invention

The present invention is in the field of plant nutrition.

2. The Prior Art

It is well known that for optimizing plant growth it is desirable that the plant be supplied with nutriment at an essentially constant rate, e.g. that the concentration of nutrient to which the root structure of the plant is exposed be maintained at an essentially constant predetermined level or range.

Typically, in accordance with present practice, nutriments, such as fertilizer, mineral trace elements, etc., are administered intermittently, e.g. by occasional applications of fertilizer. As a result, the plant is exposed to high concentrations of nutriments directly after feeding, a procedure which may be dangerous to the plant and which is wasteful of the nutriment. For example, fertilizer in unduly high concentrations may burn the roots or may promote growth at an unduly rapid and, hence, unhealthy rate. Also, where the concentration of nutriment is so high that the plant is unable to assimilate it, increments of the nutriment will, in time, be leached from the soil to a position at which they can be of no benefit to the plant.

Typically, the high initial nutriment concentrations following application of fertilizer are followed by periods in which the concentration of fertilizer is undesirably low, with the result that the nutriment level is unpredictable.

It is feasible to water plants with a solution of fertilizer in desired concentration and thus maintain the fertilizer level in the growing medium at a desired concentration. However, such practice obviously requires the continuous reformulation of the water-nutrient solution, a procedure which is time-consuming and, to a degree, wasteful in that increments of the solution will pass clear of the root area of the plant. Additionally, there is a reluctance on the part of the user to handle or work with fertilizer products.

Numerous systems for maintaining fertilizer levels in a desired range without resorting to repeated applications have been attempted. By way of example, fertilizers or like nutriments have been combined with materials which are slow to dissolve whereby increments of the soluble components are released at each watering. While such procedure does, to a degree, reduce the amount of fertilizer immediately released upon watering and extend the period over which increments of fertilizer are released, the distribution of nutriment is nonetheless largely cyclical since each successive watering will release a reduced amount of nutriment.

Attempts have been made to saturate solid, porous, non-soluble masses with a nutriment in concentrated form, with the thought that, upon watering, quantities of nutriment will be extracted. Such procedure has proven unworkable for the desired purpose for several reasons. It has been found, for instance, that initial wettings preferentially extract nutriment from the external layers of the inert material, with the result that less and less soluble matter is extracted on subsequent wettings.

Additionally, soluble material tends to crystalize and clog the interstices within the initially porous mass, whereby subsequent wettings are prevented from entering into and extracting the material from the interior of the mass.

Still other procedures intended to maintain a constant nutriment level have resorted to a permeable waxy material encapsulating increments of nutriment.

Numerous drawbacks inhere in such products, and particularly a progressive reduction in fertilizer release with the passage of time. Additionally, in order to be effective, the pellets of waxy material are preferably disposed below the level of the soil and there is thus no way to determine when the fertilizer content has been effectively exhausted or, after exhaustion, to remove the inert and usually non-degradable materials from the soil.

To summarize, the use of so-called long acting nutriment systems heretofore known have failed to provide a means for accurately controlling nutriment concentrations in the soil over an extended time period.

SUMMARY OF THE INVENTION

The present invention may be summarized as relating to an apparatus for administering to the soil or other plant growing medium, over protracted periods of time, increments of nutriments, such as fertilizer, minerals, etc., at an essentially constant rate, the quantity of materials released being a function essentially solely of the amount of water added at each watering.

The apparatus preferably may include means for signalling depletion of the nutriment content, indicating that the apparatus should be replaced.

More particularly, the invention relates to a container, preferably including a reservoir portion having substantial capacity and adapted to be positioned above the level of the soil or like growing medium, and a probe portion communicating with the reservoir adapted to be inserted to a substantial depth within the soil. The probe portion has means defining an aperture in the otherwise sealed container. The size of the aperture may be selectively chosen in accordance with the desired amount of nutriment to be released but is of a size larger than capillary size to prevent the possibility of clogging.

The container is characterized by being filled in the reservoir and probe portions with an integral mass of hydrophilic gel, within which has been dissolved, preferably in concentrated quantities, nutriments of the type sought to be communicated to the soil.

The gel is water saturated but is not subject to being dissolved when the same is in the feeding environment. An area of the gel is exposed to the soil at the aperture above noted, which aperture is installed in the growing medium in such manner, e.g. at a sufficient depth within the medium, that significant evaporation of water from the gel is prevented. Optionally and preferably, a water soluble dye is embodied in the gel.

In use, with each watering, a quantity of nutriment is extracted from the gel component within the probe, and particularly from the components of the gel directly adjacent the aperture. The quantity extracted will depend essentially solely upon the amount of water which has been brought into contact (either directly or by capillarity) with the surface of the gel exposed at the aperture.

It will thus be recognized that following watering, a concentration of nutriment in the probe area directly adjacent the aperture will differ from the concentration of such nutriments in areas remote from the aperture.

Although the concentration of nutriment will have been reduced in the probe area, the moisture concentration within the gel mass will have remained essentially constant since increments of the water added to the soil will have passed into the interior of the container and increments of moisture within the gel mass will have been released with the nutriments to the soil.

We have discovered that following watering, the concentration of nutriments within all areas of the gel system will tend to equalize and, thus, the nutriment content in the probe portion adjacent the aperture will be the same as the nutriment content in all other portions of the container, including the reservoir. Such equalization will have been completed prior to the next schedule watering, with the result that, upon subsequent watering, the added moisture comes in contact with the gel component which is saturated or essentially saturated with the nutriment materials.

It is recognized that the concentration of nutriment per unit volume of gel will be reduced over a protracted period of time, and, hence, the amount of nutriment extracted on each watering will likewise be somewhat reduced in essentially a direct proportion to the residual nutriment concentration. For this reason, the apparatus may be discarded when a concentration of 75 or 80% of original is achieved, dosages discharged to the soil then still being about 75 to 80% of the original dosages released.

Although disposal of the apparatus after partial utilization of its contents involves elements of waste, any apparent waste is more than compensated for by the efficiency with which the discharged contents are used, by reason of maintenance of optimal concentrations of nutriment at precise locations relative to the plant roots. In other words, while other systems are more efficient in the context of imparting a higher percentage of contained nutriment to the soil, such apparent efficiency is illusory in the sense that only a minor fraction of the nutriment so transmitted may be assimilated by the plant with beneficial effect.

The waste factor is placed in proper perspective when it is considered that an apparatus in accordance with the invention, containing a total mass of only about 17.5 grams of gel-fertilizer containing about 8 grams of fertilizer may be used to feed a plant in a 6 inch diameter pot for a period in excess of 1 year, release per watering at the end of such one year period being calculated to remain at or above 80% of release at the initial watering. Although the apparatus, which may be discarded at the year's end will still contain a significant quantity of fertilizer, applicants are unaware of any other practical means for distributing 8 grams of fertilizer in a 6 inch pot to maintain optimal concentrations over a 1 year period.

Optionally, the nutriment value in the gel may be maintained at even a more constant level by the addition, either homogeneously within the gel mass or preferably at a position remote from the dispensing aperture of nondissolved but soluble nutriment concentrations which progressively enter into solution in the gel mass as the nutriment concentration in the mass is reduced below saturation point.

Where a dye is incorporated in the gel material, the depletion of the nutriments in the gel is accompanied by a concomitant depletion of the dye and consequent change in gel color, which may readily be observed, as the reservoir is normally to be located above the level of the soil.

By the appropriate selection of reservoir and aperture size and fertilizer characteristics, a single apparatus in accordance with the invention may be employed to feed a plant for periods of over one year.

In accordance with a modification of the invention, the probe component is provided with means for forming apertures of accurately predictable sizes, rendering the device capable of supplying nutriment at greater or lesser rates.

Accordingly, it is an object of the present invention to provide an improved apparatus for transferring nutriments to growing media for plants whereby essentially constant quantities of nutriment are released to the growing media during each watering at a rate which is a function essentially of the quantum of water added.

A further object of the invention is the provision of an apparatus of the type described wherein the release of nutriment may be extended over protracted periods.

A further object of the invention is the provision of a device of the type described including a reservoir portion and a probe portion containing an integral mass of hydrophilic gel material which is water saturated and which contains, in addition, a concentrated solution of nutriments, the probe portion being adapted to be disposed beneath the surface of the soil and preferably in the root area of the plant, while the reservoir remains above the surface of the growing medium to permit visual access thereto.

Still a further object of the invention is the provision of a device of the type described wherein the probe portion is provided with means for selectively determining the size of the aperture which is to be contacted with the growing medium, the size of such aperture governing the area of the gel material exposed to the growing medium and, hence, the quantity of nutriment released during each watering.

Still a further object of the invention is the provision of apparatus of the type described including a quantity of undissolved soluble nutriment in contact with said gel mass at a position remote from said aperture, whereby the concentration of said material in the gel is maintained at a saturated level, and hence the amount released per watering remains a constant.

To attain these objects and such further objects as may appear herein or be hereinafter pointed out, reference is made to the accompanying drawings, forming a part hereof, in which:

FIG. 1 is a perspective view of an apparatus in accordance with the invention;

FIG. 2 is a vertical section taken on the line 2—2 of FIG. 1;

FIG. 3 is a magnified section showing the probe portion of the apparatus installed in a pot or like plant feeding environment.

DEFINITIONS

The term "gel" as used hereinafter, and particularly as used in the claims, is intended to refer to a water permeable, hydrophilic, water saturated gel made from a water soluble gum of the type which will maintain its structural integrity in contact with water and under the ambient conditions contemplated in use, notwithstanding the presence of the nutriment compositions employed in the particular formulation. The physical properties of the gel are such that the same is essentially deformable or elastic but shape-retaining at least within the time periods and applications hereinafter contemplated.

The term "nutriment" as used in the specification or "plant support reagent" as used in the claims is intended to refer broadly to substances useful in enhancing the health of plants including, in addition to fertilizing and mineral increments, materials such as systemic poisons for insect control and combinations of the noted ingredients.

Although it will be apparent from the ensuing description that the container vehicle within which the gel may be encompassed may vary in form from application to application, there is shown in FIGS. 1 to 3 a specific configuration of container-dispenser apparatus, it being understood that the same is not to be interpreted in a limitative sense.

As shown in FIG. 1, the article in accordance with the present invention comprises a container 10, which is desirably formed of inexpensive polymeric material, such as polyethylene or the like, and is preferably translucent or transparent. The container incorporates a major body portion 11 forming a reservoir for the contents 12, and a probe portion 13 which is preferably elongated and of a progressively reduced cross section at positions increasingly spaced from the reservoir 11.

The container 10 may be of unitary construction or, as shown, may include a frusto-conic top section 14 having an annular opening 15 which forms a tight snap-fitted connection with a complemental annular opening 16 of the probe section 13 of the container. The unit may include a cap 17 having a cylindrical skirt 18 extending downwardly through circular aperture 19 formed in the upper section 14 of the container. The connections defined between the cap 17 and the top section 14 of the container, and the top section 14 and probe portion 13 of the container are hermetically sealed. In the form of container illustrated, the gel material 12 is filled through the opening 19 prior to the application of the cap 17.

The probe 13 preferably includes adjacent its lower end 20, a series of cylindrical portions 21, 22, 23 of progressively decreasing diameter. In use, the probe portion 13 is embedded beneath the surface of the growing medium, e.g. soil, sand, etc., after severing an element of the probe in one of the areas 21, 22, 23. The probe components surrounding the cut will define a dispensing aperture, the cross sectional area of which will be dependent upon which of the portions 21, 22, 23 is severed.

It will be further understood that the larger the cross sectional area of the dispensing aperture, the greater the amount of nutriment which will be released per watering. Thus, by providing means for defining dispensing apertures of a selected size, the apparatus may be accommodated to dispensing varying quantities of nutriment-for instance, in accordance with the pot size or special nutritional requirements of the plants cultivated.

It will be further recognized that for commercial use, for instance, the stepwise probe end component may be omitted.

Central to the effective operation of the apparatus is the provision of a system incorporating a gel as hereinabove defined, within which gel there is contained a solution, preferably saturated, of a desired nutriment or nutriments, and preferably also an indicator dye.

Numerous gum materials have been found to be effective in producing gels or gel systems (gel plus nutriment and dye) suitable for use in the apparatus. By way of example, and without limitation, satisfactory gel systems have been formed from gums or gel forming substances of the following types:

a. natural and synthetic polysaccharides, e.g. agar, alginates, furcelleran, guar, pectinates, starches, methylcellulose, carboxymethyl cellulose b. protein - casein, gelatin c. inorganic - sodium silicate d. other synthetics - polyvinylpyrrolidone (PVP), polyvinyl polymers, polyethylene oxide, Pluronic (T.M), a Wyandotte Chemical Co. product.

As suggested in the preceding definition of the term "gel", the gel system must be stable, e.g. cannot be precipitated by the nutriment material employed, particularly as the latter material is typically used in concentrated form. Similarly, the gel should not be soluble and subject to removal or decomposition when the plant is watered and should be stable at the ambient conditions in which its use is contemplated.

For purposes of illustration a particularly useful gel system-general purpose feeding formulation for plants based upon a sodium alginate base may be made from the following ingredients:

EXAMPLE I 1800 grams soluble fertilizer (20% nitrogen; 20% phosphoric acid; 20% soluble potash, potential acidity 30% water 2040 grams sodium alginate 72 grams calcium sulfate — 96 grams trace elements 4.5 grams. (Trace elements include manganese, iron, copper, zinc, boron, molybdenum and sulfur).

A specific alginate found to be satisfactory is manufactured by the Kelco Company of Clark, New Jersey under the trademark KELCOSOL. KELCOSOL has been identified by Kelco Company as a highly refined sodium salt of alginic acid.

The filling for the container is fabricated by first dissolving fertilizer and trace element components in the water at about 60° C. The alginate salt is thereafter slowly added. Following the dissolving of the alginate, calcium sulfate is dusted in with a minimum of mixing since the gel forms quite rapidly. It is preferred that the minimum mixing time after the calcium salt is added not exceed about 2 minutes, as otherwise such mixing would result in a fracturing of the gel. The mixture is promptly added to the containers and permitted to stand at room temperature for about 2 days, by which period the mixture will have assumed a consistency approximating that of a gelatin dessert.

Optionally and preferably, a quantity of water soluble dye in concentration of about 0.01% or less is added to the mixture in the course of its formulation, suitable dyes for such purpose being specified hereinafter.

The containers, after gelling of the contents, should be protected from freezing.

A multiplicity of gel forming substances may be utilized in the formulation of the gel forming system, subject to the requirement that the same be water permeable and compatible with the active nutriment.

It is well within the skill of the worker in the art to fabricate satisfactory gel systems utilizing the gum components hereinafter set forth.

The capacity of the reservoirs and area of the aperture size will largely determine the quantity of nutriment released per watering and the period of time over which effective quantities are released. By way of example and utilizing the formulation of Example I, a dispenser incorporating a total weight of about 18 grams of gel composition and having an opening diameter of approximately 0.070 inch will release approximately 25 mg of fertilizer per watering when initially inserted and, based upon a watering schedule of twice per week, will continue to dispense over 17 mg per watering at the end of 1 year. The quantity per watering will be adequate for an average plant in a 4 inch pot. Where the container is to be used for a 6 inch pot, an opening of 0.100 inch will be effective to release about 42 mg of nutriment on initial waterings and over 30 mg per watering some six months later. For feeding plants in a 10 inch pot, an aperture size of 0.245 inch will result in release of approximately 300 mg per watering. For such larger size pots, it is preferred that a larger sized reservoir be used and/or that quantities of undissolved nutriment be embodied in the gel.

Examples of satisfactory formulations are as follows:

EXAMPLE II (guar gum base formulation)

Approximately 88.2 grams of the fertilizer composition set forth in Example I are dissolved at room temperature in 100 ml of water to form a saturated solution.

It will be understood that other nutriment or nutrient compositions may be substituted and that in order to make most efficient use of the apparatus, saturated solutions thereof should be employed.

To the solution which is formed during rapid stirring, there are added 3 grams of guar gum.

The composition is gelled by the addition of 4 ml of a saturated solution of sodium borate.

Since the gel forms rapidly following addition of the gelling agent, it is preferred, in accordance with the instant formulation, to load the gum-nutrient into the individual containers, adding increments of the gelling agent to the containers. The containers are permitted to stand at room temperature until the contents solidify into the final gel condition.

EXAMPLE III (agar formulation)

To 100 ml water at a temperature close to boiling there are added 10 grams of agar, the mixture being stirred until the agar is dissolved.

To the resultant solution there is added sufficient nutrient to form a saturated solution. In the case of the nutrient set forth in Example I, this will amount to approximately 88.2 grams.

The liquid is stirred until the fertilizer is dissolved, and the hot solution poured into the individual containers. The containers are permitted to stand at room temperatures until the gel is formed.

As hereinabove noted, it is preferable, in certain applications, that soluble dye be added to the gel mass so that when the same is dispensed from a transparent or pellucid container, the loss of color will provide an approximate indication that the nutrient concentration has fallen to a level at which replacement is indicated.

It will be appreciated that the specific dye selected will depend upon the nature of the nutrient and gum used in the formulation of the gel. For instance, the alkalinity or acidity of the nutrient may affect certain dyes and not others. Similarly, certain dyes may form chemical bonds with certain of the gums used in the formation of the gels, e.g. where a polyvinyl alcohol is used, many of the water soluble dyes are counter-indicated.

By way of examples of water soluble dyes which have been successfully incorporated in the composition of Example I, there may be mentioned:
F.D.&C. Blue No. 1 (brilliant blue)
D.&C. No. 5 (alizarin cyanin green F)
D.&C. green No. 6 (quinizarin green S.S.)
F.D.&C. yellow No. 5 (tartrazine).

The noted water soluble dyes appear to diffuse much more rapidly out of the gel and into the watering medium than does the nutrient composition. As a result, enough of the dyes to cause a significant change in color will have passed out of the containers before the nutrient concentration reaches an undesirably low level. By reason of the rapid diffusion property of the dyes, it is feasible, by trial and error with particular formulations, to adjust the quantity of dye incorporated in the gel in such manner that the change in color forms a valid indicator of the termination of the useful life of the apparatus, i.e. when the concentration of nutriment falls to a level whereat unacceptably low discharges of nutriment are extracted on watering.

As a guide line, it is almost never necessary to utilize dye concentrations exceeding about 0.01% of the total formulation.

It should be noted that the specific formulations and gel bases indicated have been added in compliance with statutory requirements and are not to be viewed in a limitative sense, it being well within the skill of the art in the light of the above teachings to devise a gel system as hereinabove defined which is capable of dispensing nutriments of various sorts to a growing medium, such as soil, sand, over protracted periods, responsive to watering of the growing medium.

Referring once again to the drawing, and particularly FIG. 3 thereof, there is shown an approximation of the condition resulting from the forcing of the probe into the growing medium after severing of the sealing tip.

The growing medium may generally be granular. Increments 24 of the granular material will, as a result of the downward movement of the probe through the mass of soil, sand, etc. force its way into intimate contact through the dispensing area 25 defined by severance of the tip and into contact with the interface portion 26 between the gel and the growing medium. The slight elasticity or deformability of the gel adds to the likelihood of communication between gel and growing medium at the interface.

While the theory under which essentially constant quantities of nutriment are released per given constant application of water is not known with certainty, tests suggest that the device operates in the following manner:

Upon application of a predetermined given quantity of water to a growing medium in which an activated apparatus has been embedded, essentially constant quantities of the water are caused, by capillary action and/or flow, to come in contact with the interface portion 26 between the growing medium and the gel. The probe is preferably inserted into the soil to such depth that there is little or no significant evaporation from the interface area 26.

The exposure to water at such interface area will result in a transfer of soluble nutriment from the gel components in the probe to the contacting water. Since the probe is preferably located in the root or feeding area of the plant, a condition which is facilitated by the shape of the probe, the nutriments are released in a manner in which they may be efficiently employed by the plant.

In addition to the release of nutriment to the growing medium, there is an interchange of moisture between the added water and the water already existing in the gel system at each watering, with the result that, assuming watering on a recommended periodic basis, e.g. twice a week, the moisture content of the gel system will remain essentially constant throughout the life of the apparatus.

Directly after watering, the nutriment concentration in the probe area will fall below the nutriment concentration within the gel system in the reservoir area. However, with the passage of time and as a result of diffusion within the gel system, a nutriment equalization throughout all portions of the gel system occurs, with the result that by the next scheduled watering, the concentration of nutriment at the probe area adjacent the interface 26 will have been restored essentially to the original concentration.

Theoretically, of course, due to the nutriment extracted from the system during each watering, the amount of nutriment in the system and, hence, the concentration at the interface will be slightly reduced following each watering. However, the fact that the nutriment is released to the precise area of the plant best able to assimilate the same in ideal concentration for assimilation provides a utilization of released nutriment of such efficiency that it is practicable to dispose of the article and replace the same when the nutriment concentration in the reservoir is still relatively high, e.g. 80 to 90% of the original.

It will be appreciated that where the nutriment concentration in the reservoir is reduced to the 90% level, it is anticipated that approximately 90% as much nutriment will be released per watering as was released when the unit was initially installed.

A principal distinction between the gel system feeding apparatus herein described and other slow release systems heretofore known is considered to reside in the unique property of gels, and particularly water saturated, moisture permeable gels, to permit redistribution within the matrix of the gel of the nutriment which has been preferentially extracted from the probe so that, with the passage of time, the concentration at the probe returns to, or is extremely close to, the original concentration, and essentially equal to the concentration in the reservoir.

In contrast, the use of porous, nutriment impregnated solids involved a progressive decrease in nutriment release per watering due to the preferential extraction through initial waterings of nutriment from the outer layers, with the result that the moisture of subsequent waterings is forced to travel through nutriment exhausted layers to contact nutriment bearing components.

The apparatus of the instant invention is likewise advantageous as compared with systems operating on a wick principle. In time, the pores of the absorptive material in such systems become clogged, rendering the wick ineffective for its intended purpose of transferring nutriment from a first position contacting one portion of the wick to a second position in the growing medium.

Utilization of a gel distributor system possesses the further advantage of permitting a dispensing aperture of significant size to be exposed to the growing medium whereby the possibility of blocking or clogging of the dispenser aperture, e.g. by a single large rock or pebble, is substantially lessened. In contrast, if the reservoir were filled with a liquid nutriment, there would necessarily be employed a capillary sized dispensing aperture to avoid outflow of liquid. In such case, due to the capillary size of the aperture, there is the possibility of the aperture being located within a void or against a pebble in the growing medium, with attendant loss of nutriment transfer. The yieldable physical texture of the gel and large dispensing aperture, coupled with the intimate contact obtained as a result of insertion of the probe into a granular growing medium is considered to be an additional factor assuring a predictable nutriment transfer.

As explained hereinabove, upon progressive release of nutriment materials and after the passage of time, the dosage of nutriment released per unit watering is very slightly reduced. Where it is desirable to maintain nutriment discharge essentially absolutely constant, it is feasible to insert a concentrated mass or masses of soluble nutriment concentrate, such as a tablet 27 or granules, in contact with the gel system but in spaced relation to the probe. When the amount of fertilizer which is capable of being maintained in solution within the gel system falls below saturation level, it will be appreciated that increments of the material 27 will dissolve and enter the solution, diffuse through the gel, and replace nutriments released to the growing medium through the tip or probe.

The effective aperture size in the apparatus of the instant invention is maintained at a constant since, due to the moisture present in the gel, formation of crystalline material in blocking position of the aperture is unlikely.

While it is anticipated that the principal utility of the instant apparatus will be for dispensing fertilizer to plants, trees, shrubs or the like, it will be readily recognized that other reagents than fertilizer may be distributed. For instance, the apparatus may be employed to maintain a desired degree of acidity or alkalinity in a growing medium, dispensing of systemic poison traces, etc.

Having thus described the invention and illustrated its use, what is claimed as new and is desired to be secured by Letters Patent is:

1. Apparatus for transferring plant support reagents to a watered plant growing medium, such as soil, over a protracted period at an essentially constant rate which is a function essentially solely of the quantity of water added to such medium, comprising a container generally sealed throughout the protracted period and including a reservoir portion and an elongate probe portion adapted to be embedded in said growing medium, said probe portion being in communication with said reservoir portion, means in said probe portion for defining an aperture of a desired size larger than capillary size for communicating the interior of said probe to said growing medium, said probe and reservoir portions containing means for transferring plant support reagents to the watered plant growing medium and comprising an integral diffusion mass of stable, solid, water insoluble but permeable hydrophilic gel essentially saturated with a solution of water soluble plant support reagents wherein the concentration of plant support reagents within all areas of the gel system substantially equalizes between waterings, said aperture providing contact of said diffusion mass and the water of the plant growing medium, said container and said diffusion mass remaining integral during the protracted period whereby essentially constant quantities of plant support reagents are released at each watering.

2. An article in accordance with claim 1 wherein said probe includes a plurality of extension portions of varying cross sectional areas, and said aperture is defined by a transverse section through one of said extension portions.

3. Apparatus in accordance with claim 1 wherein said gel comprises a salt of alginic acid.

4. Apparatus in accordance with claim 1 wherein the solution of said plant support reagent is a saturated solution.

5. Apparatus in accordance with claim 1 and further comprising an undissolved increment of said water soluble plant support reagent in contact with said gel.

6. Apparatus in accordance with claim 1 wherein said plant support reagent comprises fertilizer.

7. Apparatus in accordance with claim 6 wherein said gel is formed from a gum base selected from the group consisting of polysaccharide, protein, inorganic, and synthetic gum bases.

8. Apparatus in accordance with claim 1 wherein said gel includes a water soluble dye, and said container is pellucid.

9. Apparatus in accordance with claim 7 wherein said dye has a diffusion rate more rapid than the diffusion rate of said nutriment.

10. Apparatus in accordance with claim 8 wherein said dye is incorporated in said gel in quantity sufficient to evidence a palpable change in color of said gel responsive to extraction of only a minor fraction of said plant support reagent.

* * * * *